(12) United States Patent
Murdach (10) Patent No.: US 7,942,676 B2
(45) Date of Patent: May 17, 2011

(54) HUMAN SPINE MODEL

(75) Inventor: Charles Murdach, Greenland, NH (US)

(73) Assignee: Charles Murdach, Greenland, NH (US)

( * ) Notice: Subject to any disclaimer, the term of this patent is extended or adjusted under 35 U.S.C. 154(b) by 959 days.

(21) Appl. No.: 11/820,539

(22) Filed: Jun. 21, 2007

(65) Prior Publication Data

US 2008/0318195 A1   Dec. 25, 2008

(51) Int. Cl.
*G09B 23/28* (2006.01)

(52) U.S. Cl. ......... 434/274; 434/262; 434/267; 434/275

(58) Field of Classification Search .................. 434/262, 434/267, 274, 275
See application file for complete search history.

(56) References Cited

U.S. PATENT DOCUMENTS

| | | | | |
|---|---|---|---|---|
| 2,197,975 | A * | 4/1940 | Fleet | 434/274 |
| 2,537,573 | A * | 1/1951 | Conschafter | 434/274 |
| 3,762,070 | A * | 10/1973 | Culver | 434/274 |
| 4,323,351 | A * | 4/1982 | Goldsmith | 434/274 |
| 4,872,841 | A * | 10/1989 | Hamilton et al. | 434/274 |
| 6,422,874 | B1 * | 7/2002 | Green et al. | 434/274 |
| 6,908,309 | B2 * | 6/2005 | Gil et al. | 434/274 |
| 6,926,532 | B1 * | 8/2005 | Brattesani | 434/263 |
| 2003/0138764 | A1 * | 7/2003 | Gil et al. | 434/274 |

* cited by examiner

*Primary Examiner* — Xuan M Thai
*Assistant Examiner* — Jack Yip
(74) *Attorney, Agent, or Firm* — Charles Murdach (57) ABSTRACT

This invention relates generally to the field of anatomical models and more specifically to a human spine model. The disclosed human spine model includes a plurality of rigid disks each having radial elongate members that represent vertebrae, a plurality of resilient disks that represent spinal disks and a plurality of elastic band members that represent connecting muscle, all mounted on top of a housing. The rigid disks are alternately interspersed with the resilient disks thereby forming a column. The rigid disks and the resilient disks each have a centrally located aperture. The resilient disks are translucent and each have an LED imbedded within. When a rotary knob is rotated by a user a take up spindle within the housing pulls on a flexible cable traveling through the center of the disks causing a pre recorded audio message and the LED's to activate and causing the resilient disks to compress and bulge outward. The elastic bands connect one elongate member to another simulating muscle tissue.

1 Claim, 10 Drawing Sheets

HUMAN SPINE MODEL

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of anatomical models and more specifically to a human spine model.

The human spinal column and its associated muscle structure is a marvel of natural engineering. It allows a person to remain upright supporting the weight of the torso and head while also providing the ability to twist the torso and flex it from side to side.

Doctors and chiropractors, in order to demonstrate the workings of the spinal column to patients, sometimes have models of the spinal column in their offices. These models tend to be anatomically correct and show the interspersing of vertebrae with the more resilient disks in between each vertebrae. The doctor or chiropractor wishes to communicate to his or her patients the workings of the spinal column and to educate patients to the fact that excessive pressure on the spine either from lifting excessively heavy objects, or excessive side to side flexure of the spine, can cause injury to the resilient disks and other parts of the spinal column.

There is a deficiency in the prior technology however in that the previous spinal models do not graphically, either through audio means or through visual means, communicate to the patient the results of excessive stress on the spine.

BRIEF SUMMARY OF THE INVENTION

The primary object of the invention is to provide a human spine model that simulates the effect that excess compression or flexion has on the disks of the spine.

Another object of the invention is to provide a human spine model that provides audio and visual indicators of excess compression or flexion of the disks of the spine.

Another object of the invention is to provide a human spine model that demonstrates the musculature associated with spinal support.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed human spine model comprising: a plurality of rigid disks that represent vertebrae, a plurality of resident disks that represent spinal disks, a plurality of elastic members that represent connecting muscle, a top most cap, a hollow housing, a plurality of LED's, a flexible cable, a take up spindle, a spindle shaft, an audio sound micro processor, a speaker, a momentary switch, an electrical power source, a rotary knob, and a printed circuit board. Said rigid disks including a plurality of outwardly extending elongate members, said rigid disks vertically interspersed with said resilient disks forming a column, said rigid disks and said resilient disks each having a centrally located aperture, said resilient disks being translucent and each having a said LED imbedded in it, said spindle shaft residing in said hollow housing in a horizontal manner and where one end of said spindle shaft exits an aperture in the side of said housing, said take up spindle fixedly attached to said spindle shaft so that said spindle shaft is directly below said disk apertures, said spindle shaft terminating at one end in said rotary knob, said spindle shaft including an actuator rod fixedly attached to said shaft at ninety degrees to said shaft, said actuator rod capable of engaging said momentary switch when said rotary knob is rotated by a user, said take up spindle retaining one end of said flexible cable, said top cap retaining the opposite end of said flexible cable, said momentary switch capable of turning on said audio micro processor containing a pre recorded audio message and said switch also turning on said LED's. Said audio micro processor powered by said electrical power source, said micro processor and other standard electronic components mounted to said printed circuit board and said elastic bands capable of being retained by grooves in said elongate members so that each said band connects one said elongate member on a said rigid disk to an elongate member on another said rigid disk.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
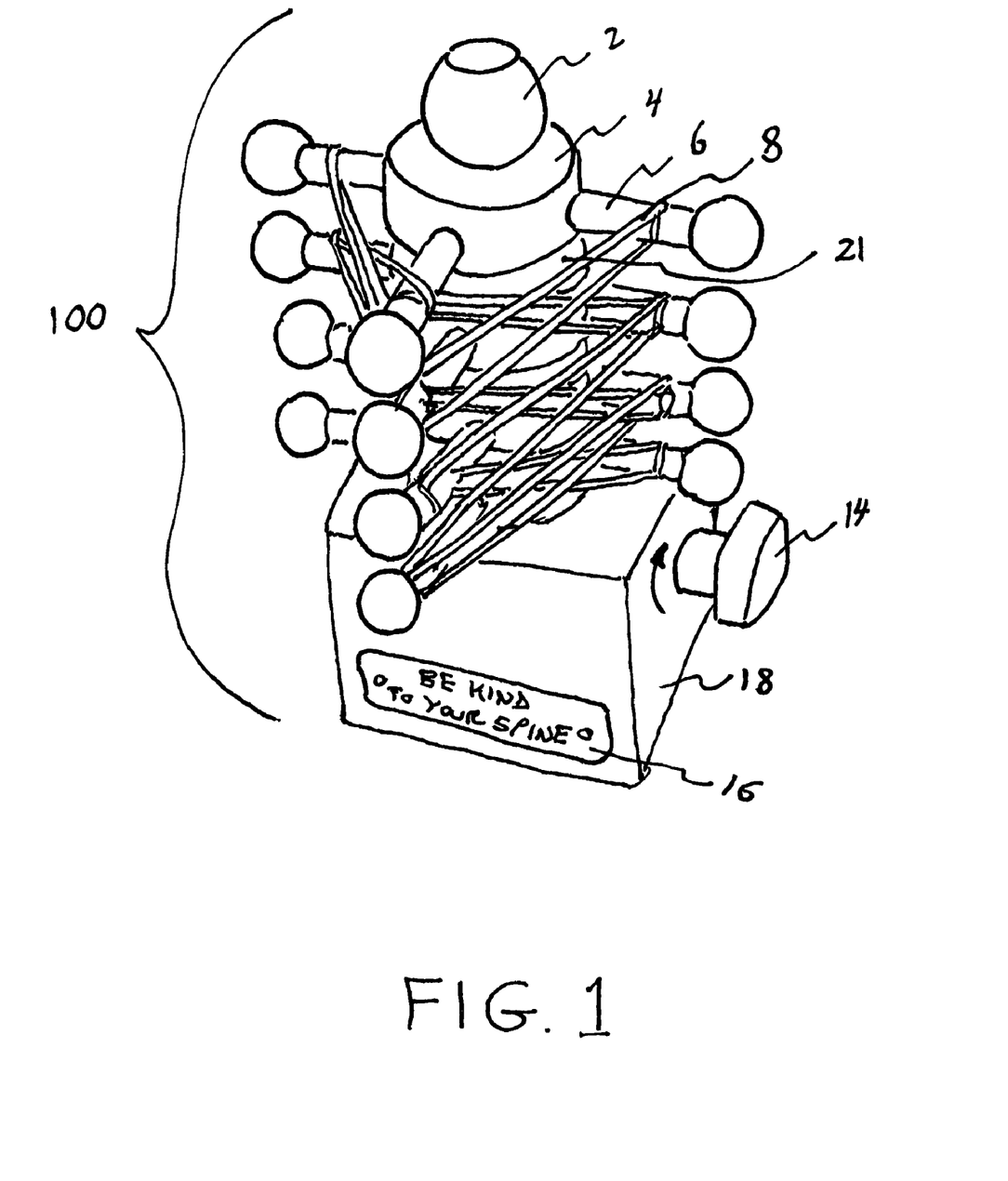
FIG. 1 is a perspective view of the invention.

Referring now to FIG. 1 we see a perspective view of the present invention 100. The device 100 is a conceptual model of a portion of a human spinal column comprising a plurality of rigid disks 4 that represent vertebrae and a plurality of resilient disks 21 that represent the flexible disks between each vertebrae. The rigid disks have elongate members 6 radially attached to the disk 4 that represent the bone portions of each vertebrae to which connective muscles, represented by elastic bands 8, are attached. The disks 4, 21 are alternately stacked on top of each other forming a column. The disks are supported by a housing 18. The disks 4, 21 are terminated at their highest point by top cap 2. Housing 18 includes a label portion 16 and a rotatable knob 14 that will be described below. The entire invention is sized to easily fit on top of a person's desk so that it may be easily seen by and demonstrated to a patient in a doctor's or chiropractor's office.

Figure 2:
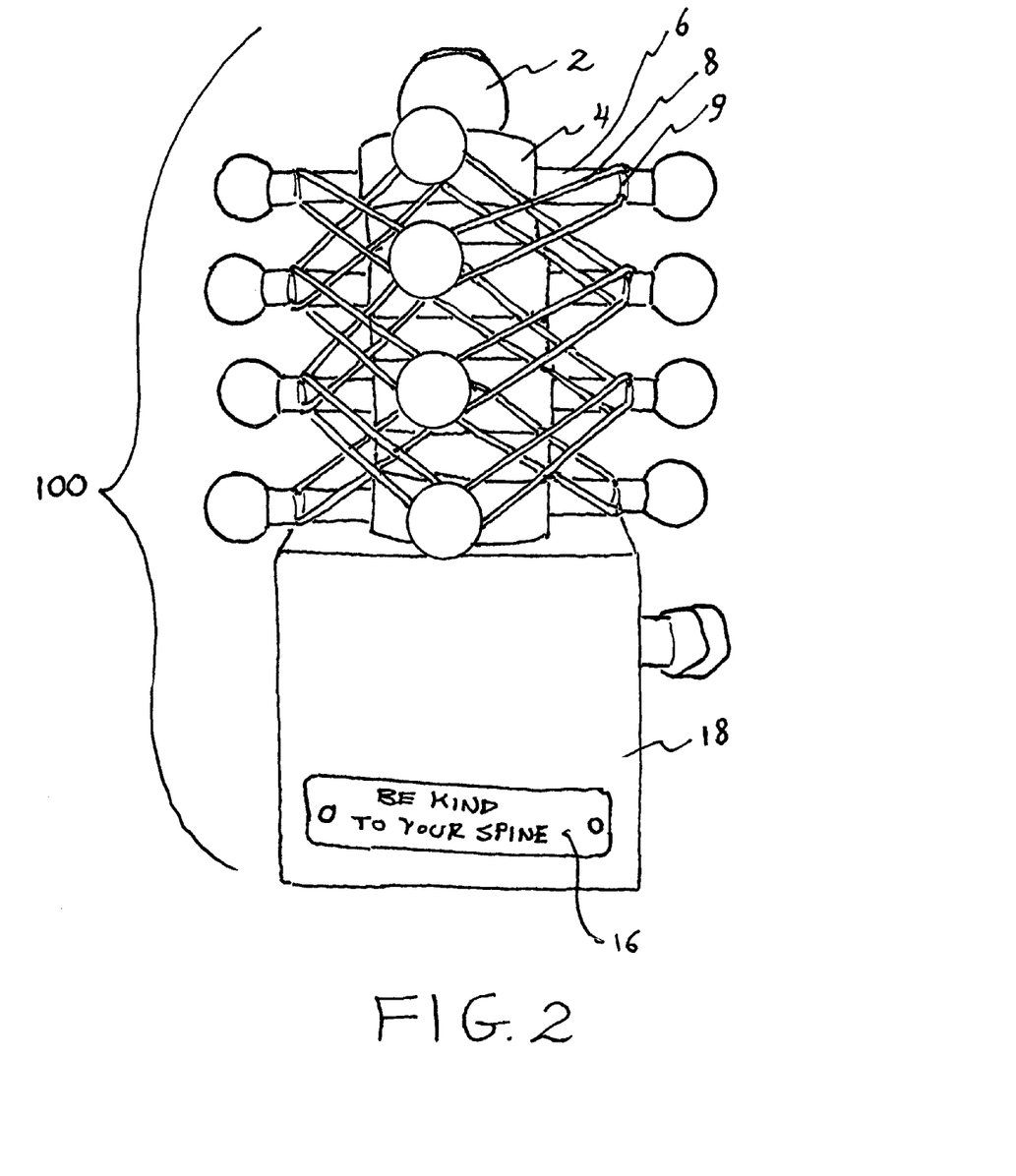
FIG. 2 is a front view of the invention.
Figure 3:
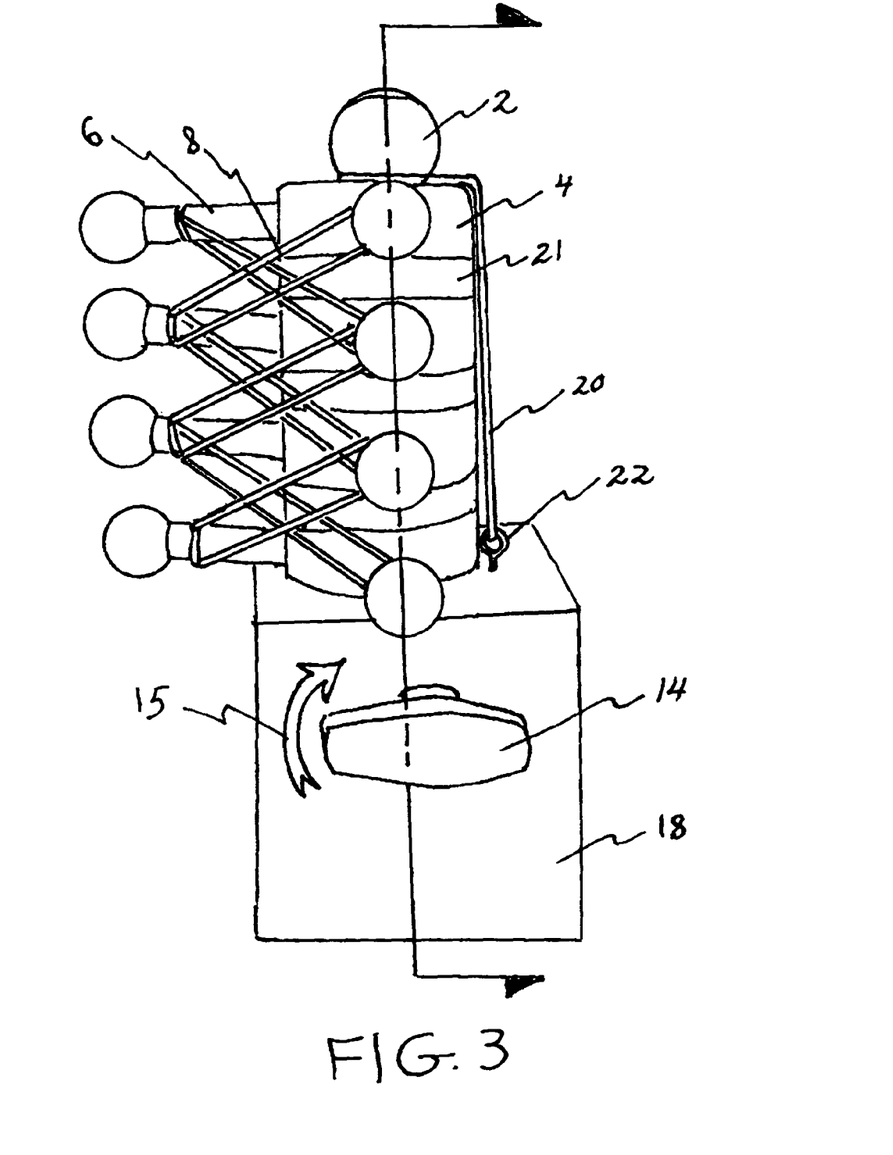
FIG. 3 is a side view of the invention.

FIG. 2 shows a front view of the invention 100. Elastic bands 8 can be clearly seen as they are connected by grooves 9 in each elongate member 8 from one member 8 to another. This configuration of bands is meant to illustrate the musculature that helps support the human spinal column. Label portion includes wording such as "be kind to your spine" but can also include the name of a care giver, doctor, chiropractor, or an individual having a spinal related injury. FIG. 3 shows a side view of the invention 100. rear support band 20 is attached at one end to an eye bolt 22 fixed to housing 18, and to the underside of top cap 2 at the opposite end. Knob 14 is clearly shown as is turn indicator graphic 15.

Figure 4:
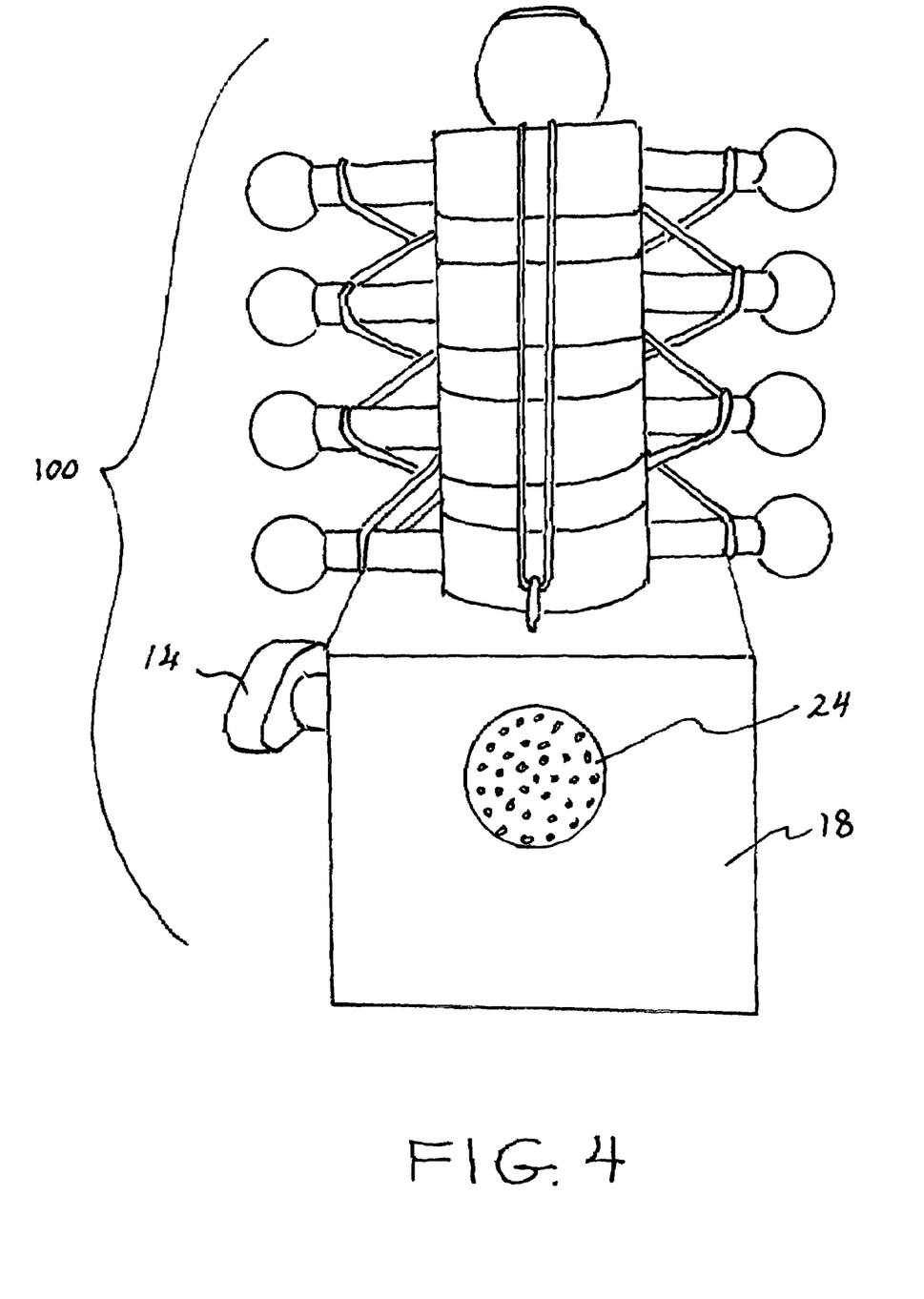
FIG. 4 is a rear view of the invention.

FIG. 4 is a rear view of the invention 100. Speaker grill 24 can be clearly seen and will be explained in more detail below.

Figure 5:
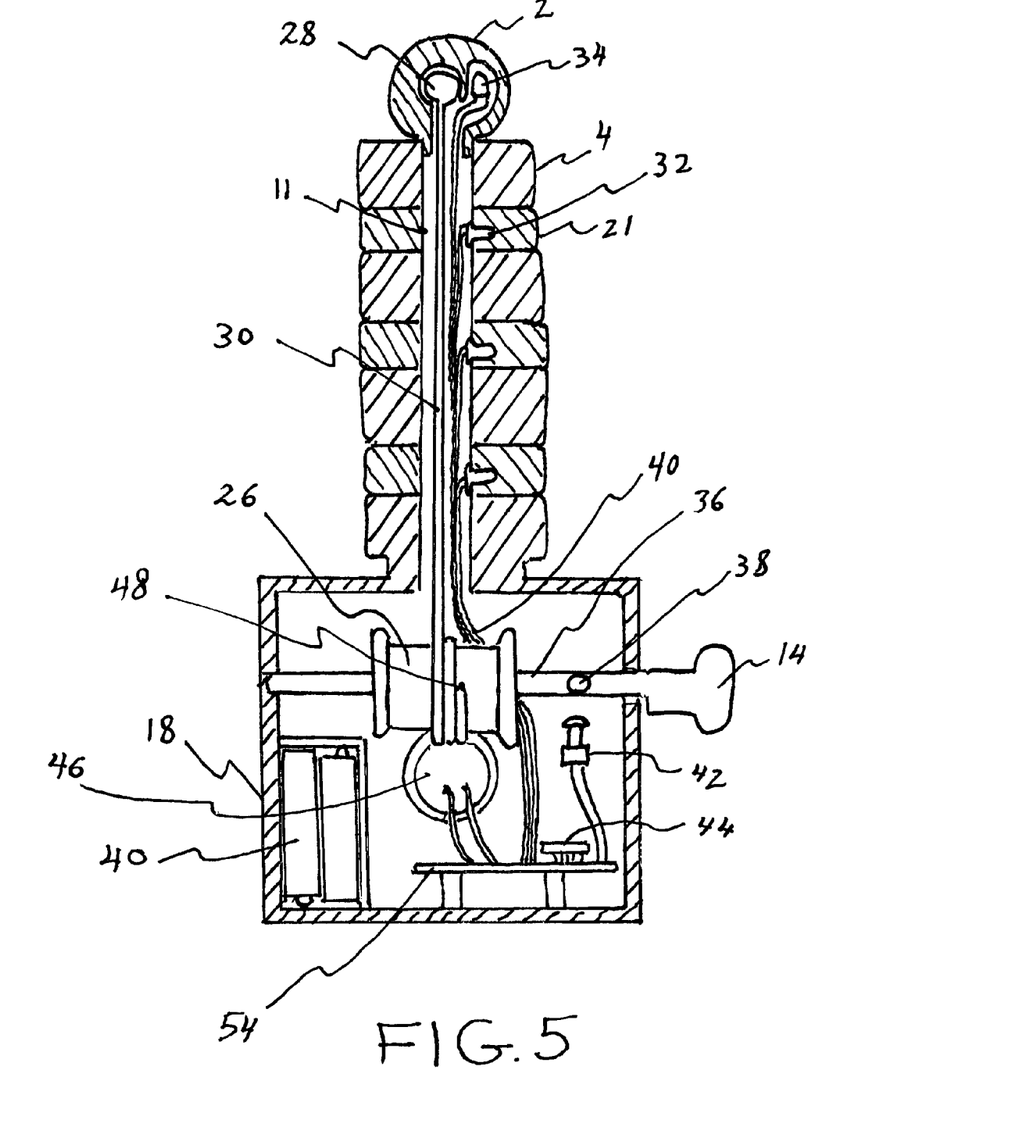
FIG. 5 is a front section view of the invention.
Figure 6:
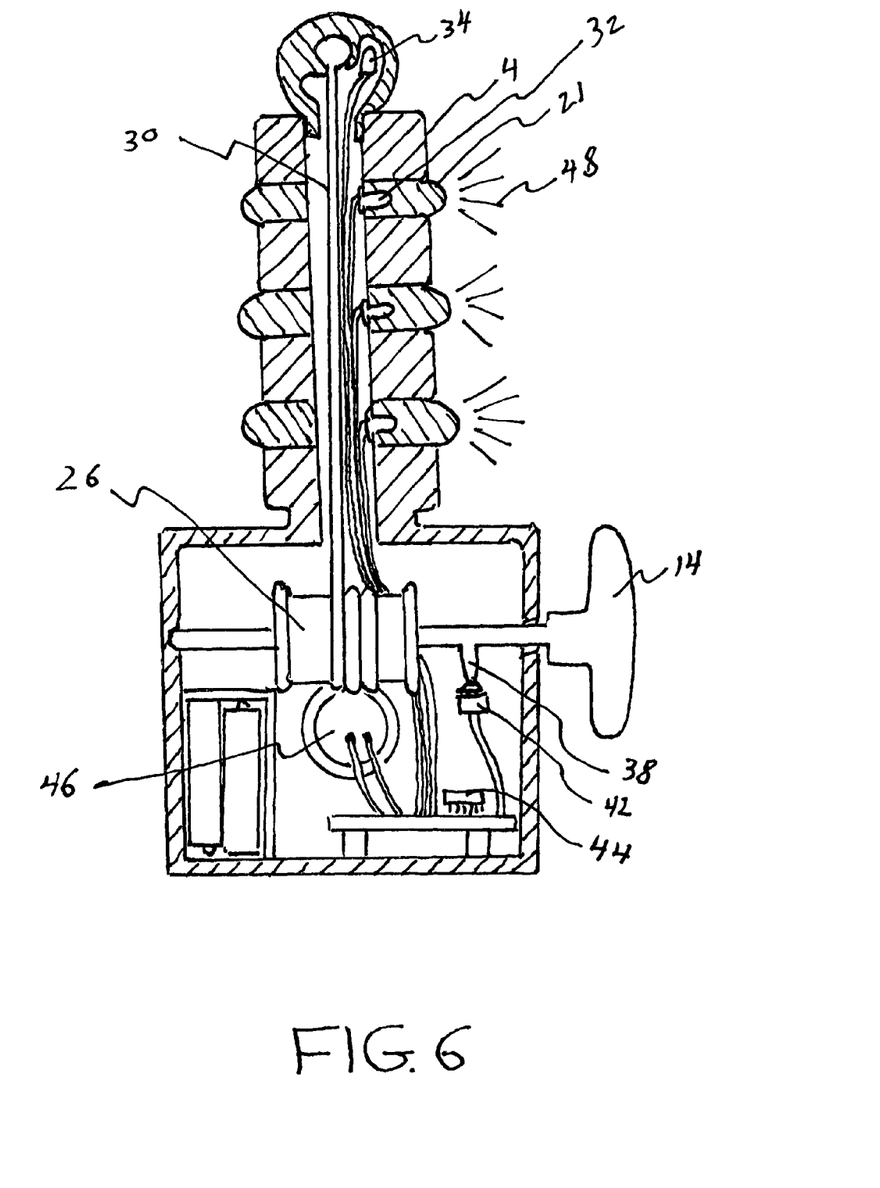
FIG. 6 is a front section view of the invention with the disks in compression.

FIG. 5 is a front section view of the invention 100 as described by section line 50 shown in FIG. 3. Rigid disks 4 and resilient disks 21 can be clearly seen alternating with one another to form a vertical column. Elongate members 6 and band members 8 have been removed from this view for clarity purposes. A centrally located aperture 11 in each disk 4, 21 forms an internal hollow column. A flexible cable 30 attaches at one end within top cap 2 via restraining ball 28 and at the opposite end is fixed 48 on take up spindle 26. Spindle 26 is fixed on horizontal shaft 36. Shaft 36 exits housing 18 on one side and terminates in knob 14. When knob 14 is rotated be the user, the flexible cable 30 becomes further wrapped on spindle 26 thereby causing the resilient disks 21 to become compressed and to bulge out as shown in FIG. 6. Additionally, when knob 14 is rotated by the user, the actuation post 38 fixed at ninety degrees to shaft 36 rotates and engages the actuation arm of switch 42 as shown in FIG. 6. The switch 42 causes two things to happen simultaneously. One is that an audio message stored in micro processor 44 is broadcast by speaker 46. PC board 54 supports the micro processor 44 as well as wire connection points for all electric wires. The second is that LED's 32 embedded in resilient disks 21 become lit as indicated by light ray symbols 48. wires 40 connect LED's 32 and tilt switch 34 to PC board 54. Disks 21 are made of translucent electromeric plastic having a low durometer rating. A power source 40 such as DC batteries, sends power the audio device and the LED's 32. The resulting effect as shown in FIG. 6 is that when the user rotates knob 14, the disks 21 become compressed and are also lit by LED's 32, and the audio portion emits a recorded message such as "Ouch! Be kind to your spine!" These visual and auditory effects reinforce on the viewer the serious implications of putting excessive compressive stress on spinal disks.

Figure 7:
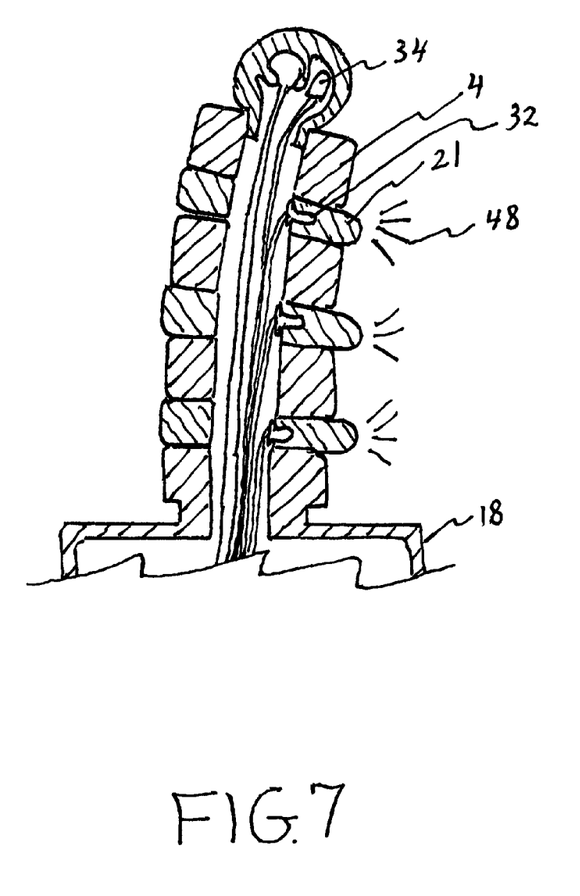
FIG. 7 is a front section view of the invention with the disks in flexion.

FIG. 7 shows another way that the invention 100 can demonstrate stress on the spine. When the user flexes the disk column by pushing on the top cap 2, the column is deformed causing resilient disks 21 to be compressed on one side causing the disk material to bulge on one side. Tilt switch 34 becomes closed by the resulting angle of tilt when the column is pushed to one side. The tilt switch 34 activates the audio and LED components as described above. This side flex action shows a viewer that excessive spinal flex can be damaging to the disks that reside between each spinal vertebrae.

Figure 8:
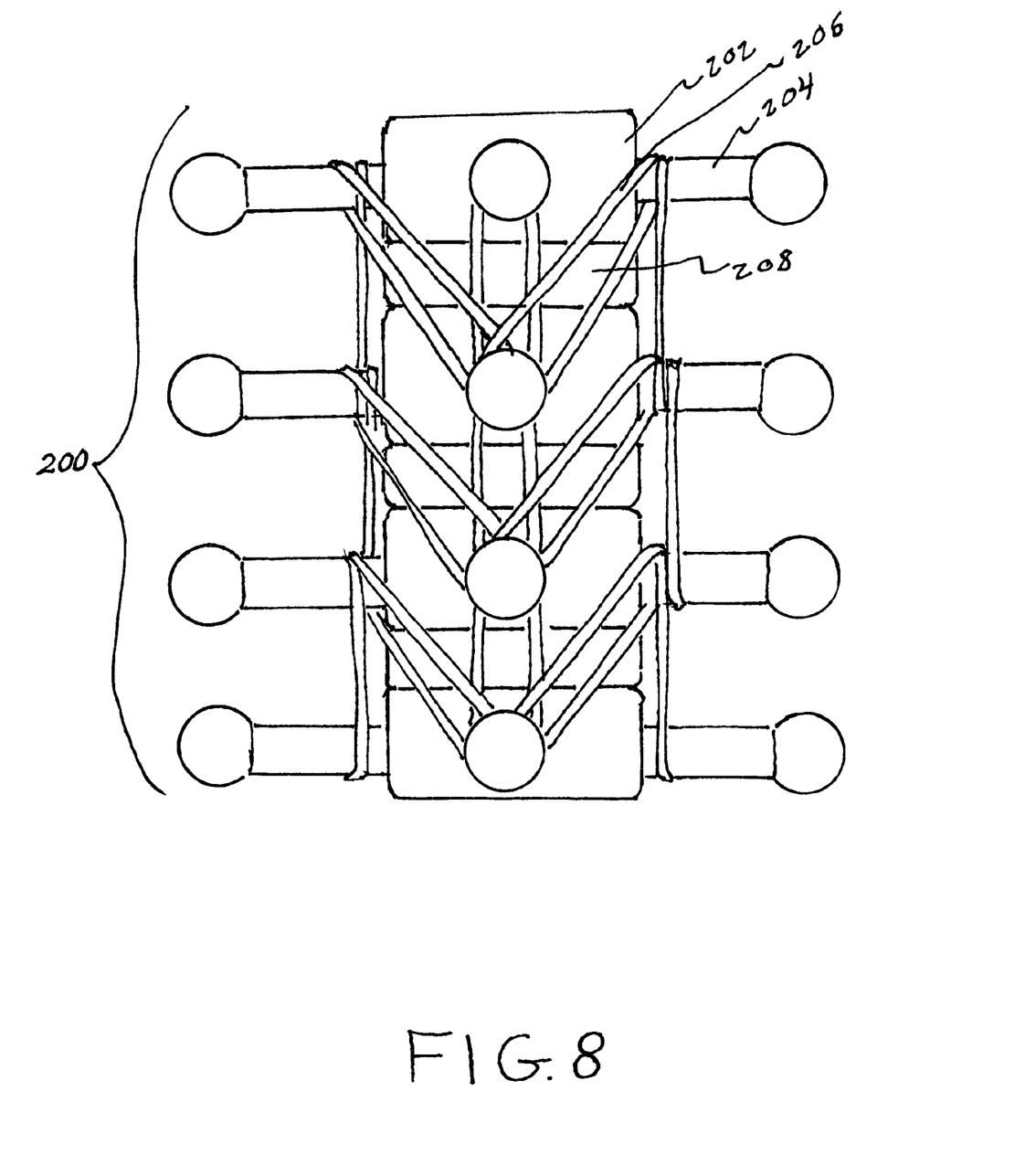
FIG. 8 is a front view of an alternate embodiment of the invention.
Figure 9:
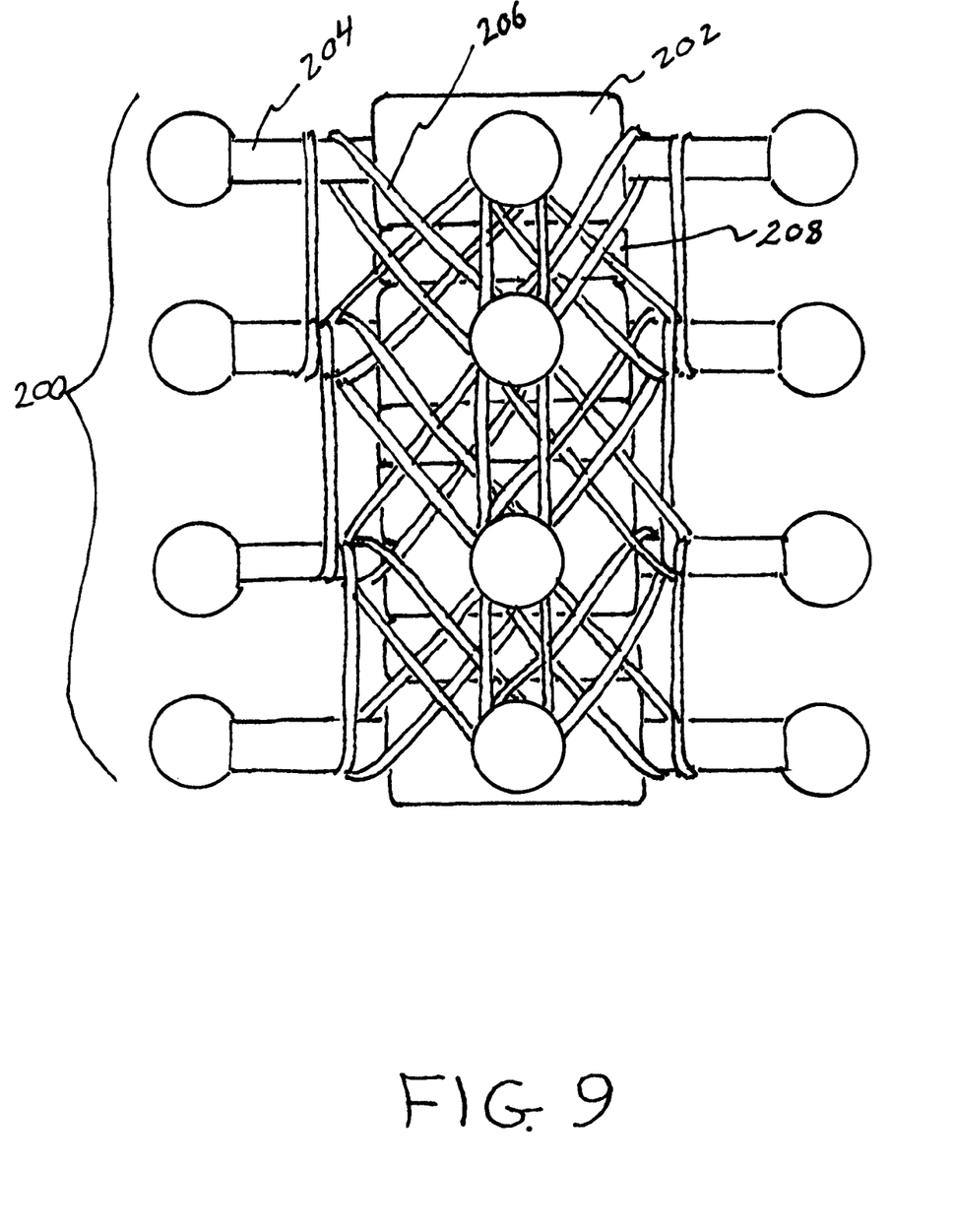
FIG. 9 is a rear view of an alternate embodiment of the invention.
Figure 10:
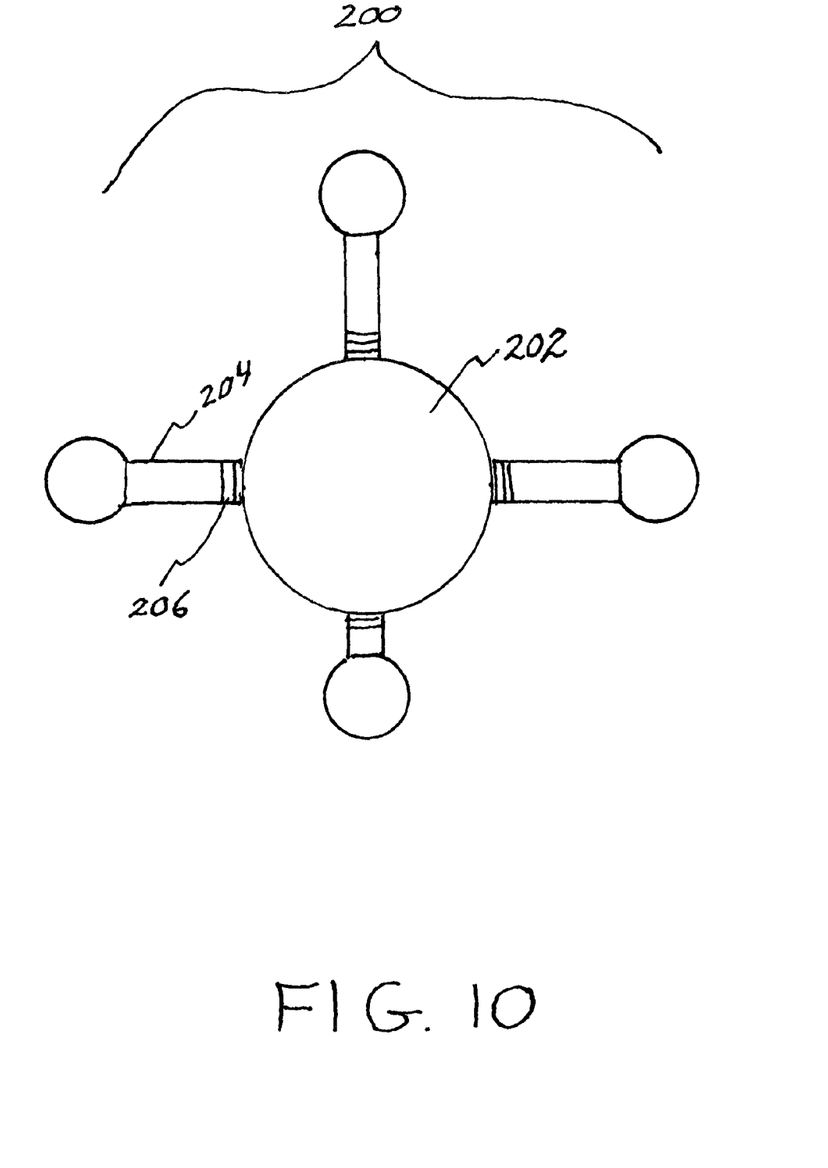
FIG. 10 is a top view of an alternate embodiment of the invention.

FIG. 8 shows a front view of an alternate embodiment of the invention 200 that includes alternating rigid disks 202, elongated members 204, resilient disks 208 and elastic bands 206. However, it does not include audio or visual displays as shown in the preferred embodiment. The alternate version of the spine model 200 is simple in construction and can be used for instructional purposes where users can assemble and disassemble the disk pieces and bands of the model to increase understanding of spinal mechanics. FIG. 9 is a rear view of the alternate embodiment 200. FIG. 10 is a top view of the alternate embodiment 200.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An anatomical model for demonstrating a spinal column to a user, the model comprises a plurality of rigid disks; wherein each of the plurality of rigid disks represents a segment of a vertebrae; said rigid disks further includes a plurality of outwardly extending elongate members and a centrally located aperture; the model further includes a plurality of translucent resilient disks and a plurality of LED's; wherein each of the plurality of translucent resilient disks represents a spinal disk; said translucent resilient disk further includes a centrally located aperture and embedded with one of the plurality of LED's; wherein said plurality of rigid disks vertically interspersed with said plurality of translucent resilient disks forming an interior aperture and an exterior shape of the spinal column;

the model further includes a plurality of elastic bands for representing connecting muscle of spinal column; wherein each elastic band is capable of being retained by a groove on the elongate member so that each elastic band connects one elongate member on one rigid disk to another elongate member on another rigid disk;

the model further includes a spindle shaft, a housing unit with a recess area, a horizontal and vertical opening, and an actuator rod; said spindle shaft includes a first end inserts into the recess area of the housing unit and a second end exits from the horizontal opening of the housing unit; said actuator rod fixedly attached to the spindle shaft at ninety degree relative to the shaft; said actuator rod capable of engaging a momentary switch when the spindle shaft is rotated by a user; the housing unit further includes a speaker, an audio microprocessor which is mounted onto a printed circuit board, and an electrical power source for powering the audio microprocessor;

the model further includes a take up spindle, a flexible cable and a top cap located on the top of spinal column; wherein the take up spindle is fixedly attached to the spindle shaft so that the spindle shaft is positioned directly below the vertical opening of the housing unit and capable of accessing the interior apertures of the spinal column; and the take up spindle retains one end of the flexible cable and the top cap retaining the opposite end of the flexible cable;

the model further includes a rotary knob attaches to the second end of the spindle shaft; said rotary knob, when rotated by said user, causes the flexible cable to be rolled up onto the take up spindle causing the translucent resilient disks to compress and bulge outward; at the same time causing the actuator rod to engage with said momentary switch activating a pre-recorded audio message stores within the audio microprocessor and turning on the plurality of LED's embedded within the plurality of translucent resilient disks;

the model further includes a tilt switch located in the top cap; said tilt switch connected by electrical wires to the audio microprocessor and the plurality of LED's so that when the user places his or her fingers on said top cap and flexes the spinal column, the angular motion of the top cap causes said tilt switch to activate thereby playing the pre-recorded audio message and turning on the plurality of LED's.

* * * * *